United States Patent [19]

Osborne et al.

[11] Patent Number: 4,849,020
[45] Date of Patent: Jul. 18, 1989

[54] ASPHALT COMPOUNDS AND METHOD FOR ASPHALT RECONDITIONING USING MICROWAVE RADIATION

[75] Inventors: Tracy L. Osborne; William R. Hutcheson, both of Valparaiso, Ind.

[73] Assignee: The Titan Corporation, Valparaiso, Ind.

[21] Appl. No.: 40,274

[22] Filed: Apr. 20, 1987

[51] Int. Cl.⁴ .............................................. C08L 95/00
[52] U.S. Cl. .............................. 106/281.1; 106/273.1
[58] Field of Search ........................ 106/273 R, 281 R

[56] References Cited

U.S. PATENT DOCUMENTS

| | | | |
|---|---|---|---|
| 2,347,233 | 4/1944 | Abernathy | 428/147 |
| 2,408,251 | 9/1946 | Dantz | 404/28 |
| 2,886,459 | 5/1959 | Lajoie | 106/282 |
| 3,291,011 | 12/1966 | Defregger et al. | 427/137 |
| 3,601,448 | 8/1971 | Stone | 299/14 |
| 3,603,221 | 9/1971 | Barton | 404/31 |
| 3,778,109 | 12/1973 | Anderson et al. | 299/14 |
| 3,907,582 | 9/1975 | Walter | 106/281 R |
| 4,011,184 | 3/1977 | van Reijendam et al. | 525/98 |
| 4,032,355 | 6/1977 | McLaughlin | 106/281 R |
| 4,175,885 | 11/1979 | Jeppson | 404/77 |
| 4,190,757 | 2/1980 | Turpin et al. | 219/10.55 E |
| 4,252,459 | 2/1981 | Jeppson | 404/77 |
| 4,252,487 | 2/1981 | Jeppson | 404/77 |
| 4,266,108 | 5/1981 | Anderson et al. | 219/10.55 E |
| 4,276,093 | 6/1981 | Pickermann | 106/281 R |
| 4,319,856 | 3/1982 | Jeppson | 404/79 |
| 4,347,016 | 8/1982 | Sindelar et al. | 404/95 |
| 4,453,856 | 6/1984 | Chiostri et al. | 404/91 |
| 4,512,806 | 4/1985 | Graham | 106/18.24 |
| 4,594,022 | 6/1986 | Jeppson | 404/28 |

FOREIGN PATENT DOCUMENTS

| | | |
|---|---|---|
| 79103728 | 10/1979 | European Pat. Off. . |
| 7907601 | 10/1979 | Netherlands . |
| 2659685 | 8/1978 | U.S.S.R. . |

OTHER PUBLICATIONS

"Industry Warms Up to Microwave Ovens", High Technology, Mar. 1987, pp. 62-63.
"Microwave Methods Enable Energy Savings in Restoration of Highway Pavements" by Franklin J. Smith, J. Microwave Power, 1986, 79-81.
"Microwave Heating of Asphalt Paving Materials", by Ronald L. Terrel and Abdulaziz Al-Ohaly, Feb., 1987.
"Effect of Microwave Heating on Adhesion and Moisture Damage of Asphalt Mixtures", by Abdulaziz A. Al-Ohaly and Ronald L. Terrel, Jan., 1988.

Primary Examiner—Paul Lieberman
Assistant Examiner—Christine A. Skane
Attorney, Agent, or Firm—Allegretti & Witcoff

[57] ABSTRACT

An improved asphalt composite utilizes a mixture of asphalt and a lossy microwave absorptive material normally in a granular form and dispersed homogeneously throughout the asphalt matrix. The use of a microwave material, particularly one having a Curie temperature in the range of about 100° C., enhances removal, reconditioning and reforming the asphalt during patching or repair operations which rely upon microwave radiation heating.

13 Claims, 5 Drawing Sheets

TABLE OF TEST DATA OBTAINED BY HEATING 40g SAMPLES OF ASPHALT WITH VARYING PERCENTAGES OF REDUCED IRON OXIDE TO MELTING POINT

ASPHALT COMPOUNDS AND METHOD FOR ASPHALT RECONDITIONING USING MICROWAVE RADIATION

BACKGROUND OF THE INVENTION

This invention relates to an improved paving material and a method for using the material.

Paving of roadways, sidewalks, pathways and the like is commonly accomplished with asphaltic materials. For example, building of an automobile roadway typically calls for the preparation of an appropriate road bed of fill, crushed stone or the like. Layers or courses of asphalt material are then placed on the road bed. As each layer is placed, it is appropriately leveled and compacted.

Typically the asphalt material is a mixture of bitumen and stone which are heated and mixed together at a site mixing plant. The hot mixture is then transported to the roadway for application by special machinery. The composition of each asphaltic layer as well as the thickness of each layer is dependent upon the projected amount of use and type of use of the roadway. An automobile roadway sublayer may typically have a thickness of seven to twelve inches of course asphalt and a final or top layer on the order of two to three inches in thickness of fine asphalt. On occasion, in order to improve skid resistance, sand or stone chips are provided on or within the surface of the top layer. The entire mass, of course, is leveled and then rolled by road rollers to provide a smooth, firm, level surface.

In addition to the use of asphaltic materials for new roadway construction such materials are useful for roadway repair. Repair o; asphalt roadways is often performed by scraping away an entire layer of the roadway and replacing the removed layer with a new layer of asphaltic material. The new layer may be reconstituted asphalt made in part from previously removed asphalt material. Alternatively, newly prepared asphalt can be used. The patching of asphalt roadways as well as patching of concrete highways may also be effected by placement of a hot asphalt patch in the area which requires repair after that area has been appropriately cleaned.

As an alternative to the use of hot mixtures of asphaltic materials, there are many cold mixes of asphaltic materials used for patching purposes. Thus, the term "asphalt" as used in this application is to be used in its broadest sense and includes any of those paving materials either in cold form or hot form such as bitumen, petrochemical mixtures, polymeric mixtures and other mixtures to pave and repair roadways.

In the repair of roadways or other asphaltic surfaces, it has been found beneficial to apply heat to the area being repaired during or after the repaving or repair operation. For example, a gas flame heater or a radiant heater may be used to heat the asphaltic material and cause that material to soften or to be cured. The heating of the asphaltic material enhances its workability. If the asphalt is to be removed or scarified, heating of the asphalt material will enhance the scarification operation. Moreover, the reheated material may be reconstituted for replacement and reuse on the roadway.

Among the methods which have been proposed for heating of asphalt material is the use of microwave energy. Jeppson in U.S. Pat. No. 4,594,022 as well as in U.S. Pat. Nos. 4,319,856, 4,175,885, 4,252,459 and 4,252,487 describes various methods and apparatus for heating pavements with microwave energy. In U.S. Pat. No. 4,594,022, Jeppson further describes the use of a sheet or layer of microwave reflective material such as a metal foil below a top layer of asphaltic material. The embedded sheet of metallic material acts as a microwave reflector to enhance the heating of the top layer of asphaltic material. This is accomplished by reflection of the microwave energy from the metal foil layer. As a further refinement of the method and construction described by Jeppson, openings may be defined in the sheet for control of passage of microwave energy further into the asphalt.

Jeppson teaches that microwave energy will typically penetrate into a asphalt material approximately seven to eight inches. This is based upon the use of microwave equipment positioned at the surface of a layer which generates microwaves having frequencies of 915 megahertz (MHz) or 2450 MHz. Such microwaves have wave lengths of 33 centimeters and 12 centimeters respectively. As noted by Jeppson, however, the full microwave spectrum includes frequencies from about 400 MHz to about 300,000 MHz corresponding to wave lengths from about 75 centimeters to about 0.1 centimeters.

In sum, in the Jeppson patents there is a disclosure of the concept of using microwave energy to heat various asphaltic materials including hot asphaltic materials as well as cold mixes for the purpose of facilitating paving, repaving, scarifying, patching and other roadway paving and repair operations. There has remained, however, a need for enhancement of the use of microwave energy which is imparted to an asphalt mix or layer of paving. Further, there has remained a need to develop ways to eliminate direct or radiant heating of asphalt materials during repair, etc. Jeppson notes, for example, that the microwave energy source which he teaches is often useful in combination with alternative heat sources. Elimination or diminishment of the need for such alternative heat sources would be beneficial in terms of energy efficiency. Thus, there has remained a need for improved and additional methods for controlling the dispersal and utilization of microwave energy in the repair of asphaltic roadways.

SUMMARY OF THE INVENTION

In a principal aspect, the present invention comprises an improved composite mix for roadways which is susceptible to controlled heating for efficient repair when exposed to microwave radiation. The composite mix is comprised of an asphalt or asphaltic material, defined in the broad sense, and a lossy microwave material. In general, the lossy microwave absorptive material comprises a material selected from the group consisting of semi-conductors, ferromagnetic materials, metal oxides, dielectric materials, metals (in powder or particle form) and mixtures thereof.

Lossy microwave materials are those materials which absorb microwave energy by absorbing either the electrical, the magnetic, or both portions of an impinging electromagnetic waveform. Electrically lossy materials transform microwave energy from the electric portion of the waveform into heat as a result of resistive heating of the material due to eddy current losses. Heat in magnetic lossy materials is created by hysteresis losses at microwave frequencies.

Materials which are ferromagnetic typically absorb and transform both the electrical and magnetic portion of the waveform into heat. Above the Curie temperature, i.e. the temperature above which the material becomes paramagnetic, ferromagnetic materials do not absorb the magnetic portion of the waveform. As a result, magnetic heating above that point is eliminated. However, ferromagnetic materials will continue to absorb the electrical portion of the waveform above the Curie point. On the other hand, if the ferromagnetic material is high in volume resistivity, the electric or eddy current heating will be low, particularly above the Curie point.

Thus, by using an appropriate lossy microwave material homogeneously mixed with the asphalt material, enhancement or accentuation of energy transfer will result when the mix is exposed to microwave radiation. Preferably the microwave material is ferromagnetic with a Curie temperature in the range of 50° C. to 700° C. and a high volume resistivity. By choosing such a preferred microwave material with a prescribed Curie temperature and high& volume resistivity, the temperature of the composite mix, when exposed to microwave radiation, is effectively and closely controlled and heating of the mix is enhanced. It has been found that a low volume or weight percent of such lossy microwave material in the mix on the order of two percent (2%) is sufficient to achieve the desired result.

Further, by controlling the thickness of a layer of paving material comprised of the described composite, it is possible to control with greater particularity the heating and reworking of a defined layer of asphalt roadway. Quantitatively, the amount of lossy microwave material preferred is in the range or amount that is minimal with respect to the volume or weight percent of the asphalt. Typically less than five percent (5%) by weight or volume of lossy microwave material is required. However, the range of mix of the materials is very broad and depends, to some extent, upon the characteristics sought for the paving composite.

Thus, it is an object of the invention to provide an improved asphaltic paving material or composite.

It is a further object of the invention to provide an improved asphaltic material which is especially useful in the repair, replacement and reconditioning of paved roadways.

Yet a further object of the invention is to provide an improved asphalt composite or mix for paving and for recycling of pavement which is susceptible to microwave radiation heating in a more efficient manner than prior known mixes.

Yet a further object of the invention is to provide an improved asphalt composite material useful for paving and also for recycling by methods which are not labor intensive.

Yet a further object of the invention is to provide an improved asphalt mix which is susceptible to microwave heating and which also has a relatively low raw material cost.

A further object of the invention is to provide a composite asphalt material which may be more efficiently heated by microwave radiation without utilizing a layer or sheet of metal foil imbedded in the asphalt material. Nonetheless, the asphalt material may be effectively and efficiently used in combination with a layer or sheet of metal foil imbedded therein.

Another object is to provide an improved method for repairing asphalt roadways.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
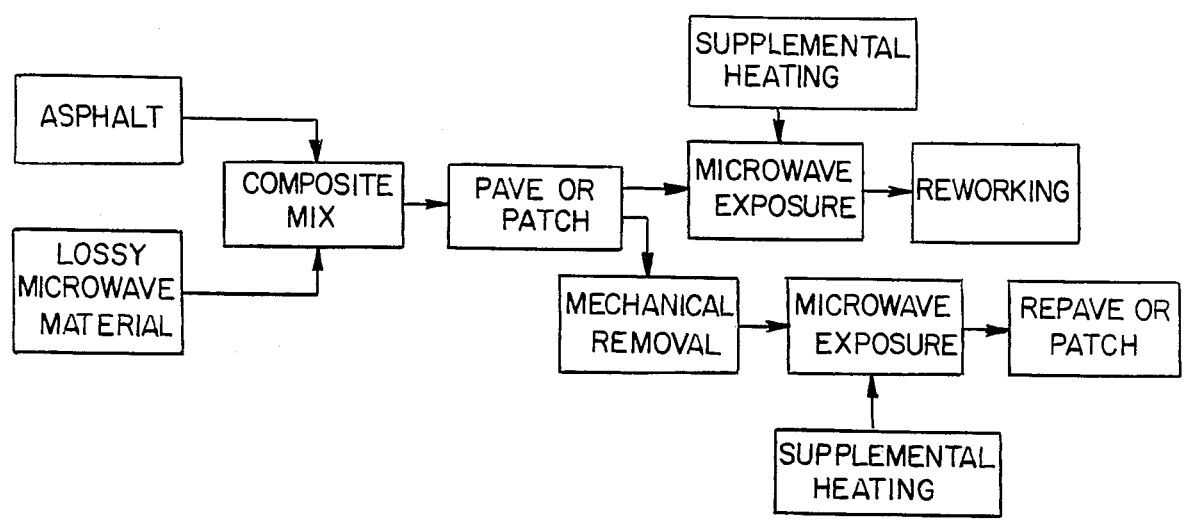
FIG. 1 is a flow chart illustrating the method of fabrication and manner of use of the asphalt composite of the present invention.

Construction and repair of a roadway using asphaltic materials is a generally well known art. Jeppson in U.S. Pat. No. 4,594,022 describes various methods for such construction and repair. Typically, for example, a roadway is prepared of compacted fill. A granular subbase of crushed rock is then placed on the compacted fill. When building an asphalt roadway, a thick layer of macadam on the order of 7 to 12 inches is then be placed over the subbase. One, two or three layers of asphalt are next placed on the macadam, each layer varying in thickness from 1½ inches to 3 inches.

Macadam and asphalt are generally a composite of bitumen and stone which are heated and mixed together at a site mixing plant, transported to the site of the road bed and applied by special machines while still hot. The material is leveled, rolled, and cooled to form a finished roadway.

Alternatively, an under layer of concrete may be coated with an overlayer of asphalt to provide a finished roadway. The underlayer of concrete may be an old concrete surface which is patched or repaired, and then overlaid with a new layer or layers of asphalt. In many instances, the subbase or underlayer of concrete will be new concrete which is then covered with a layer or layers of asphalt.

In all of these instances, the top layers of the asphalt will, in time, weather and degrade to some extent. The top layers, and in some instances the underlayers, must then be either repaired or replaced. Repair is effected by cleaning out the area which requires repair followed by placement of a hot patch or a cold patch of asphaltic material in the area requiring repair. Alternatively, a layer of asphalt material will be scraped from the surface of the roadway. The asphalt which has been so removed can then be reconditioned and replaced on the roadway. As another alternative, new asphalt may be placed on the scarified roadway.

Jeppson in his various patents, as previously described, uses microwave energy to supplement heating and enhance reconditioning of an asphalt roadway. Jeppson in U.S. Pat. No. 4,319,856 describes a wide variability in the ability of asphalt to be heated by microwave energy and he attributes most of the heating to silicate rocks absorbing the microwave energy in varying degrees. This variability in the absorption characteristics is a very distinct disadvantage to the efficient and uniform use of microwave energy for assisting in the repair of a roadway. In U.S. Pat. No. 4,594,022, Jeppson suggests the use of a metal foil sheet or layer to enhance the utility of microwave heating of the asphalt. The present invention contemplates another procedure for reducing such variability and enhancing microwave heating of asphalt.

That is, heretofore, the asphalt mix was made in accord with standard engineering specifications. The present invention contemplates the use of a new and unique asphalt composition which incorporates a lossy microwave material in combination with the heretofore standard asphalt compositions. A lossy microwave material is a material which, as previously described, when exposed to microwave radiation, tends to absorb that radiation thereby causing the material to be heated in an effective and efficient manner. There are numerous examples of such materials and the present invention contemplates the use of any lossy microwave substance that will heat in bulk form as opposed to or distinguished from a resistive film. The material can thus be used as an active heating media when included in a mixture with asphaltic material. Further and importantly, the use of such material provides means for maintaining uniformity in the temperature of the asphalt mix exposed to microwave radiation as contrasted to the variability noted by the prior art.

In general, there are four basic groups of substances that can be used as a lossy microwave material: The first group is semi-conductors such as zinc oxide. The second group is ferromagnetic materials which, as a further feature of the invention, have a Curie temperature at which the ferromagnetic properties dissipate and the substance becomes paramagnetic. The material thus loses some of its microwave absorptive properties. Such materials include powdered iron, iron oxides and ferrites including spinel ferrites. Also included in this group would be materials such as $Fe_3O_4$, taconite, and alloys of manganese, tin, copper, aluminum and iron. The third group of materials includes various oxides of metal such as chromium oxide, manganese oxide and nickel oxide. The fourth group is dielectric materials such as asbestos, carbon and graphite.

Ferrite powders are a particularly useful materials for the practice of the invention. Ferrites are impervious to most chemical action that can occur over a given period of time. They will not change their form and thus can be maintained in situ for long periods of time while still retaining the necessary characteristics to facilitate asphalt heating and repair. Ferrites also can be formulated for specific Curie temperatures and have a high volume resistivity.

Ferrite powders are thus preferred relative to metal powders. This results because metals oxidize in situ and may be subject to runaway oxidation during heating. Ferrites avoid these disadvantages and have a controllable Curie temperature. Consequently, it is possible to closely control the heating of the asphalt by control of the choice and amount of ferrite.

Ferromagnetic materials, like ferrites, having a high volume resistivity will enhance appreciably the heating of asphalt up to the Curie temperature. Thereafter, the magnetic microwave energy will not be effective and energy transfer or heating due to the electrical waveform will be relatively insignificant due to the high volume resistivity.

In practice, small volumes of these lossy microwave materials are mixed generally in granular or particulate form, with standard asphaltic paving materials. Asphaltic materials include mixtures of bitumen and stone as well as mixtures of polymeric materials with stone and minerals of various grade.

The range of particle size of the lossy microwave material may be varied greatly. It is preferable that the material be granular in form though the particular configuration of the microwave material is not a limiting factor of the invention.

Preferably the material is mixed with the asphalt so that there is a homogeneous mixture of the composite components. Again, however, the invention is not limited to the concept of having an entirely homogeneous mixture. There may be domains or regions of the asphalt mix wherein concentrations of the lossy microwave material are necessarily greater by design.

The concentration of weight percent or volume percent of the lossy microwave material relative to the composite mix may vary significantly from very small amounts up to fifty percent or more provided the cohesion of the asphalt mix is not adversely affected. In preferred embodiments of the invention, less than five percent (5%) and as little as one or two percent (1 or 2%) by weight or by volume of the lossy microwave material in the asphalt composite or mix will be sufficient to derive the benefits of the invention.

In the practice of the present invention, microwave energy typically has a frequency of 915 MHz. Microwave energy may be defined as radiant electromagnetic energy having a frequency within the range from about 400 MHz to about 300,000 MHz. As a practical matter, governmental authorities in any given region usually allocate certain specific frequencies within the total microwave band for various types of usage, such as communications links, radar systems, industrial processing and others. Thus the references herein made to the specific frequencies of 915 MHz and 2450 MHz, which are the two frequencies currently assigned to industrial microwave equipment in the United States of America, should not be construed as necessarily meaning that these are the best or only suitable frequencies from the strictly technical standpoint nor should they be considered as limiting the scope of the invention.

Asphalt, during commercial application or when being reworked, will typically be heated in the range of 100° C. to 125° C. Applying microwave energy in the frequency range of 915° MHz to a composite mixture incorporating ferrites, particularly ferrites having a Curie temperature of 100° C. to 125° C., imparts the desired temperature to the asphalt mix and thus accentuates the utility of the invention. For example, a ferrite having a Curie temperature of 120° C. mixed with asphalt is deemed to be especially desired and useful in the practice of the present invention. Spinel ferrites are especially useful.

Thus, the invention contemplates that the lossy microwave material will be mixed generally in granular form and generally homogeneously with asphalt to form a composite or mix. This step is represented in FIG. 1. The composite is then used in the standard fashion in the construction of a roadway, walkway, or the like. If it is necessary to remove the asphalt for reconstitution or recycling or to heat the asphalt during a patching operation, the composite, which is in situ, will be especially susceptible to heating using a microwave radiation source. This eliminates the need to have supplemental heating sources such as radiant or flame sources for heating of the asphalt in order to implement a patch.

Thus, again referring to FIG. 1, assuming that the composite of the present invention has been used to define the top layer or top two layers of an asphalt roadway and that such a roadway needs repair or rehabilitation, the pavement may be mechanically removed. The removed material is then exposed to microwave energy for reconstitution and use to repave or patch the roadway.

Alternatively, the pavement may be exposed to microwave energy for working or reworking in situ or for removal. In either event, mechanical equipment of the type well known and, for example, as described in Jeppson U.S. Pat. No. 4,594,022, can be utilized to provide the microwave energy in appropriate juxtaposition to the specially formulated asphalt composite mix of the invention and for mechanically working the mix. Additional supplemental heating means of the type well known can also be used.

Figure 2:
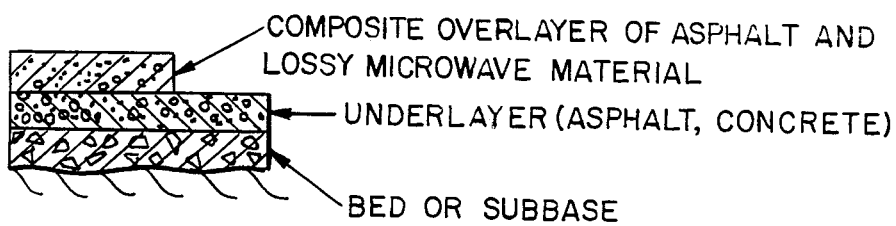
FIG. 2 is a schematic cross sectional view of the manner in which the asphalt composite of the present invention may be used for roadway paving.

Referring to FIG. 2 there is illustrated a manner in which the asphalt composition of the present invention can be utilized. There a first or underlayer of asphalt, concrete or other road material is provided. A single overlayer of the mixed asphalt and lossy microwave material is then placed thereon. More than a single overlayer may be placed on the underlayer.

Typically the first seven to eight inches of the asphalt layer is especially susceptible to the passage of microwave radiation and heating by microwave energy. Thus, it is preferred that only the top seven or eight inches of the roadway be fabricated from the composite materials described.

Figure 3:
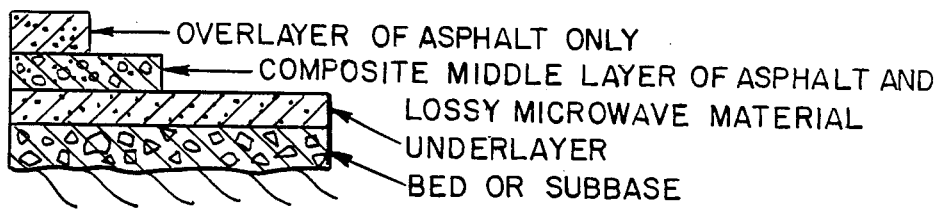
FIG. 3 is a schematic side cross sectional view of an alternative method of utilization of the improved asphalt composite of the present invention.

FIG. 3 illustrates an alternative roadway construction wherein the underlayer is initially covered by a composite middle layer of mixed asphalt and lossy microwave material. An overlayer of fine asphalt is then positioned on the composite middle layer. The dimensional restrictions discussed above will apply to this configuration so that the middle layer of the mix is susceptible to microwave penetration. Again, various permutations and combinations of layers of asphalt and the asphalt composite of the present invention may be utilized in order to effect the desired result of providing an easily repairable roadway that is susceptible to heating by microwave radiation.

Experiments have been run which demonstrate that an asphalt and lossy microwave material composite significantly reduces the time required to heat the composite with microwave energy relative to asphalt by itself. Following in Table A is a comparison of the amount of iron oxide by weight which has been added to a unit of asphalt with the relative time required to melt or liquify the asphalt composite. As will be seen, the addition of 2% by weight iron oxide reduces the time to melt the asphalt significantly. Only about 1/5 of the time is required to melt the asphalt composite when 2% by weight of lossy microwave material is included in the composite:

TABLE A
TABLE OF TIME REQUIRED TO MELT ASPHALT WITH VARYING PERCENTAGES OF REDUCED IRON OXIDE

| Amount of Reduced Iron Oxide by Weight | Time Required To Melt Asphalt |
|---|---|
| 0.00% | 100.0% |
| 0.50% | 75.0% |
| 0.75% | 56.3% |
| 1.00% | 37.5% |
| 1.50% | 25.0% |
| 2.00% | 18.8% |

Figure 4:
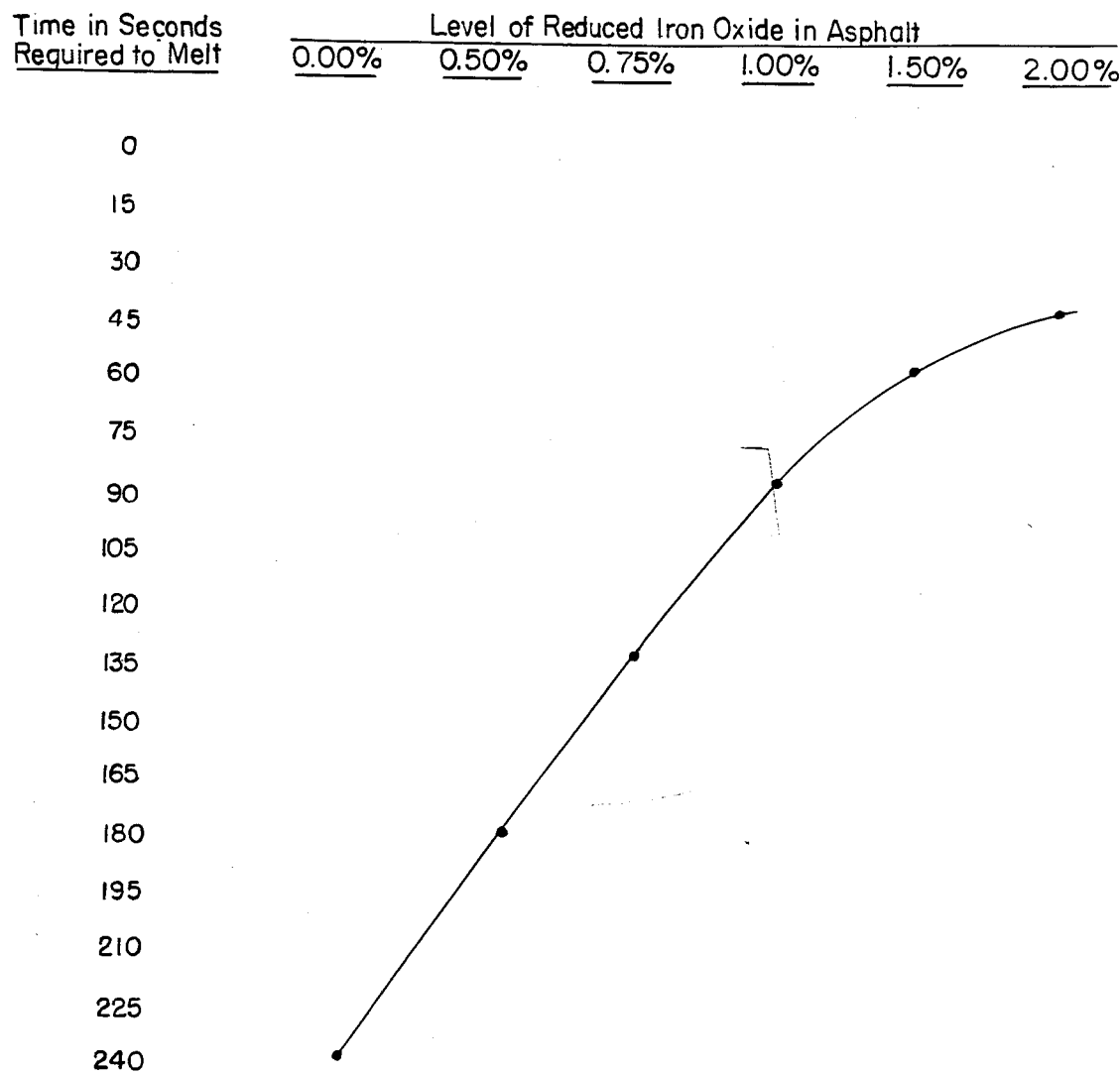
FIG. 4 is a graph illustrating the time required to heat various asphalt composites within the scope of the invention.

FIG. 4 is a graph illustrating the comparative times required to heat and liquify samples of asphalt with varying percentages by weight of reduced iron oxide composite mixed with the asphalt. In each experiment, the microwave radiation used was 2450 MHz rather than the more typical radiation of 915 MHz provided by most roadway microwave machines.

It is to be noted that the lossy microwave material can be added to the asphalt during the initial fabrication of the asphalt and application to a roadway. Alternatively, the lossy microwave material may be added during recycling of the asphalt, for example during a repair operation of the highway. Thus, the material may be added at any time when the asphalt is being prepared or mixed.

Figure 5:
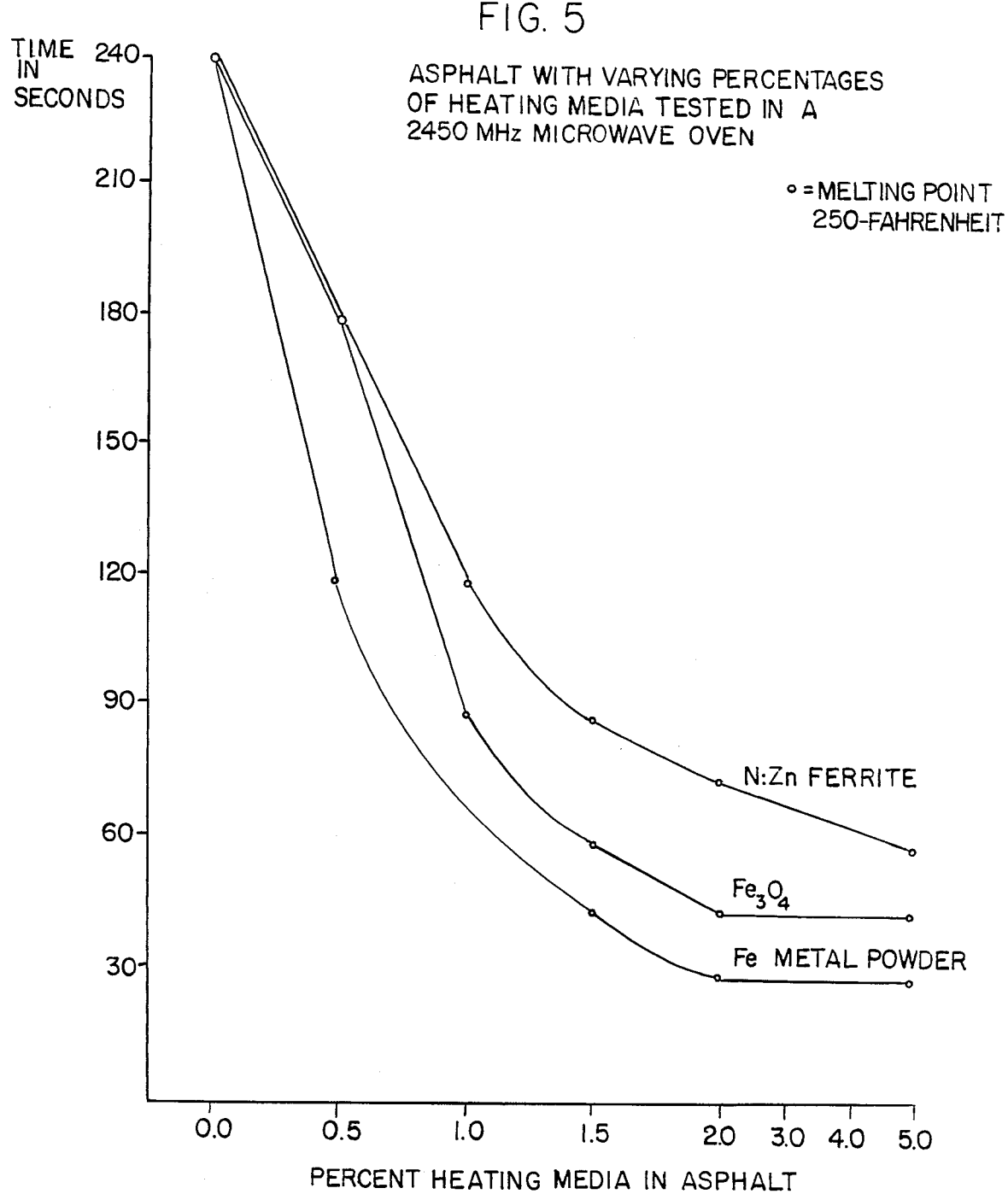
FIG. 5 is a graph comparing three different types of lossy microwave materials of varying percentage in asphalt composites.

FIG. 5 is another graph plotting the percent of heating media or lossy microwave material in the composite versus time to achieve the melting point of asphalt. Specifically, a nickel zinc ferrite material, ferric oxide ($Fe_3O_4$) and iron in a metal powder form were each added to 40 gram samples of asphalt in the weight percents set forth in the graph. Each homogeneous mixture was then heated in a microwave oven having a microwave radiation characteristic of 2450 MHz. The mixture was heated to the melting point of the asphalt which was about 250° to 300°, i.e. about 125° C. With a 2% by weight lossy microwave material in the mixture, the time to achieve melting of the asphalt material was on the order of 3 to 7 times faster than without that microwave material.

Figure 6:
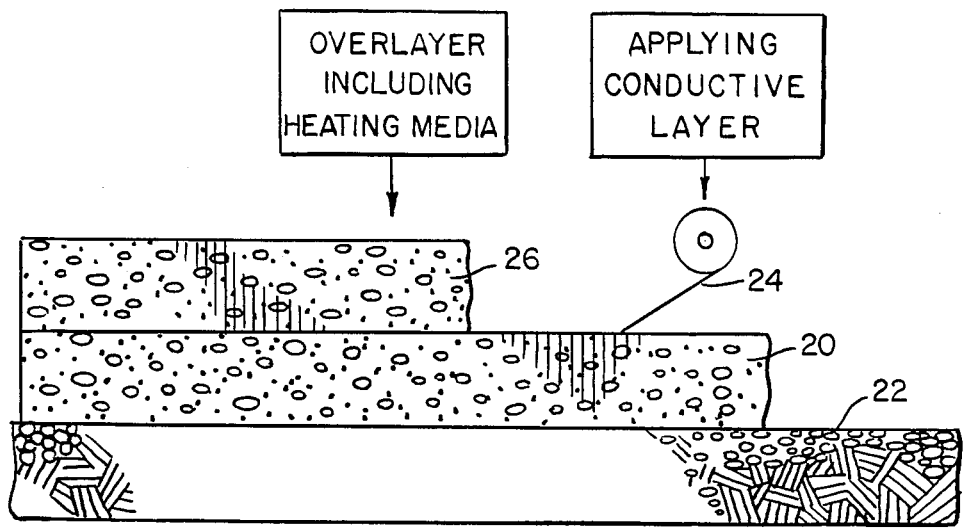
FIG. 6 is a schematic illustration of a manner of placement of a metal sheet or foil between an underlayer and overlayer of road pavement wherein the overlayer constitutes an asphalt composite of the invention.

FIGS. 6–9 illustrate schematically the manner by which the subject matter of the present invention may be utilized in combination with the method as taught in U.S. Pat. No. 4,595,022. Thus, as shown in FIG. 6, an underlayer of asphalt 20 is provided on a compacted bed or surface 22. A conductive layer or sheet 24 as taught in U.S. Pat. No. 4,594,022 is then placed on layer 20. An overlayer 26 may then be positioned on the sheet 24. The overlayer 26 preferably is a homogeneous mixture of the lossy microwave material and asphalt as heretofore described.

Figure 7:
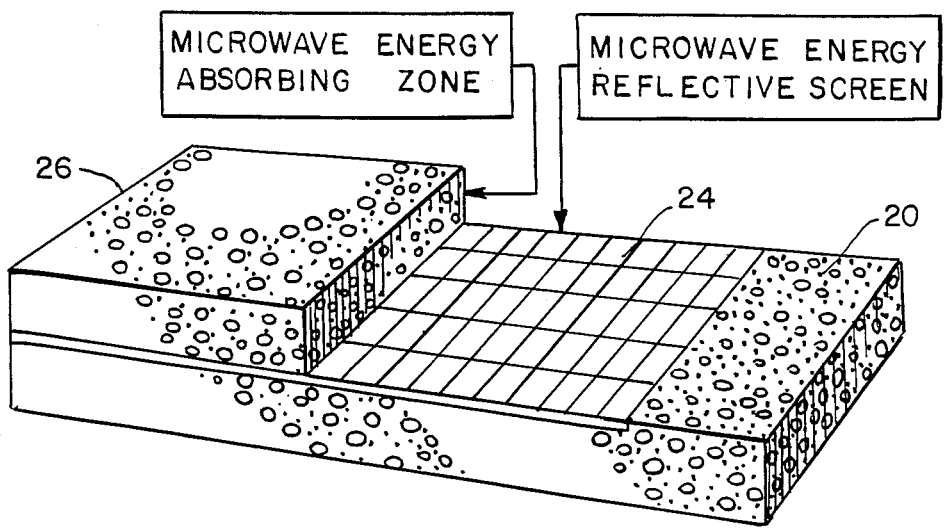
FIG. 7 is a schematic illustration depicting the location of the microwave energy reflective zone in the pavement construction of FIG. 6.

As shown in FIG. 7, the overlayer 26 will then constitute the region wherein microwave energy is more efficiently absorbed. By including the lossy microwave material as described above in the overlayer 26, heating of that overlayer is enhanced relative to the prior art. Use of the sheet 24 further enhances the heating.

Figure 8:
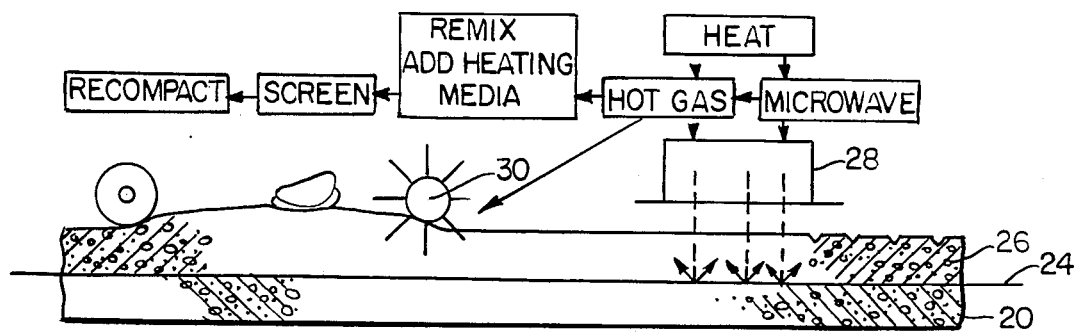
FIG. 8 is a schematic illustration of the steps in the method of repairing an asphalt pavement of the type shown in FIG. 6.

FIG. 8 illustrates how this arrangement might be utilized for repair of an existing pavement. There an underlayer 20 includes a sheet 24 with an overlayer 26. The overlayer 26 as schematically shown in the right hand portion of FIG. 8 is in need of repair. A microwave heater unit 28 (with optional gas or electric heater) directs energy into the overlayer 26. The energy dispersal unit 28 causes the overlayer 26 to melt or at least soften. The layer 26 is then mechanically removed by a mechanical scarifier 30. Subsequently it is reconstituted, relayed and compacted.

If in the first instance the overlayer 26 did not include the lossy microwave material, that material can be added during the scarifying, removal, reconstitution step represented by the mechanical device 30. Then when the asphalt is being relayed, it will incorporate the characteristics associated with the present invention. Additionally, the roadway will have characteristics for heating by microwave energy associated with the use of sheet 24.

Figure 9:
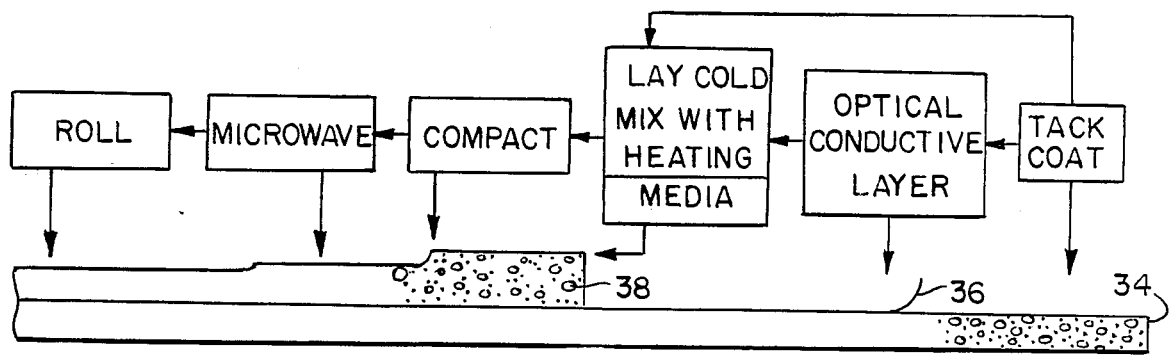
FIG. 9 is a schematic illustration of the steps in the method of initially laying an asphalt pavement of the type shown in FIG. 6.

FIG. 9 discloses yet another procedure for utilizing the method and composition of the invention. Referring to FIG. 9, an underlayer 34 is provided. An optional conductive layer 36 is placed on the underlayer 34. An overlayer of asphalt 38 which includes the lossy microwave material or heating media is then placed down on the sheet 36. The overlayer 38 may then be compacted and subjected to microwave radiation. The microwave radiation will heat the layer 38 which, upon subsequent rolling, will be further compacted into a desired form, consistency and shape.

Various other permutations and combinations of the use of the lossy microwave materials described in combination with asphalt as an overlayer, intermediate layer, in combination with sheet material or without sheet material are possible. Thus, while there has been set forth a preferred embodiment of the invention, it is to be understood that the invention is to be limited only by the following claims and their equivalents.

What is claimed is:

1. A composite for paving comprising, in combination: a mixture of asphalt and a lossy microwave absorptive material, said lossy microwave absorptive material being dispersed in the asphalt for enhancement of heat dispersal in the mix when the mix is exposed to microwave radiation, said lossy microwave material being selected from the group consisting of spinel ferrites, hexagonal ferrites and mixtures thereof and comprising from one percent (1%) to twenty-five percent (25%) by weight of said mix.

2. A composite as in claim 1 wherein the lossy microwave material comprises up to about 25% by volume of the composite material.

3. A composite as in claim 1 wherein the lossy microwave material comprised up to about 25% by weight of the composite material.

4. A composite as in claim 1 wherein the lossy microwave material comprises a ferromagnetic material having a Curie temperature in the range of 50° C. to about 700° C.

5. A composite as in claim 1 wherein the lossy microwave material is homogeneously mixed in the asphalt.

6. A composite as in claim 1 wherein the mass of the lossy microwave materials is less than the mass of the asphalt per unit volume of the mixture.

7. A composite as in claim 1 wherein the lossy microwave material is a spinel ferrite.

8. An improved method for fabricating a repairable asphaltic paving material comprising the steps of:
(a) measuring a volume of asphalt;
(b) adding a volume of lossy microwave absorptive material selected from the group consisting of spinel ferrites, hexagonal ferrites and mixtures thereof to the asphalt to form a mix wherein; and
(c) mixing the asphalt and the absorptive material to disperse the absorptive material in the matrix of the asphalt from one percent (1%) to twenty-five percent (25%) of the mix is comprised of said lossy microwave absorptive material.

9. A composite for paving comprising in combination:
a mixture of asphalt and a lossy microwave absorptive material, said lossy microwave material being dispersed in the asphalt for enhancement of heat dispersal in the mix when the mix is exposed to microwave radiation, said lossy microwave material comprising a ferrite material at least in part selected from the group consisting of spinel ferrites, hexagonal ferrites and mixture thereof, said lossy microwave material comprising from one percent (1%) to twenty-five percent (25%) of the mixture.

10. The composition of claim 9 wherein said ferrite is $Fe_3O_4$.

11. The improved composition of claim 10 in combination with other lossy microwave absorptive material.

12. A composite for paving, comprising, in combination:
a mixture of asphalt and from one percent (1%) to twenty-five (25%) of a lossy microwave material as an additive to the asphalt, said material being dispersed in the asphalt for enhancement of heat dispersal in the mix when the mix is exposed to microwave radiation, said lossy microwave material comprising a ferromagnetic material selected from the group consisting of spinel ferrites, hexagonal ferrites and mixtures thereof having a Curie temperature in the range of 50° to 700° C. and also having a high volume resistivity.

13. The improved composition of claim 12 wherein the percent by weight of lossy microwave material in the composite is less than 5%.

* * * * *